UNITED STATES PATENT OFFICE.

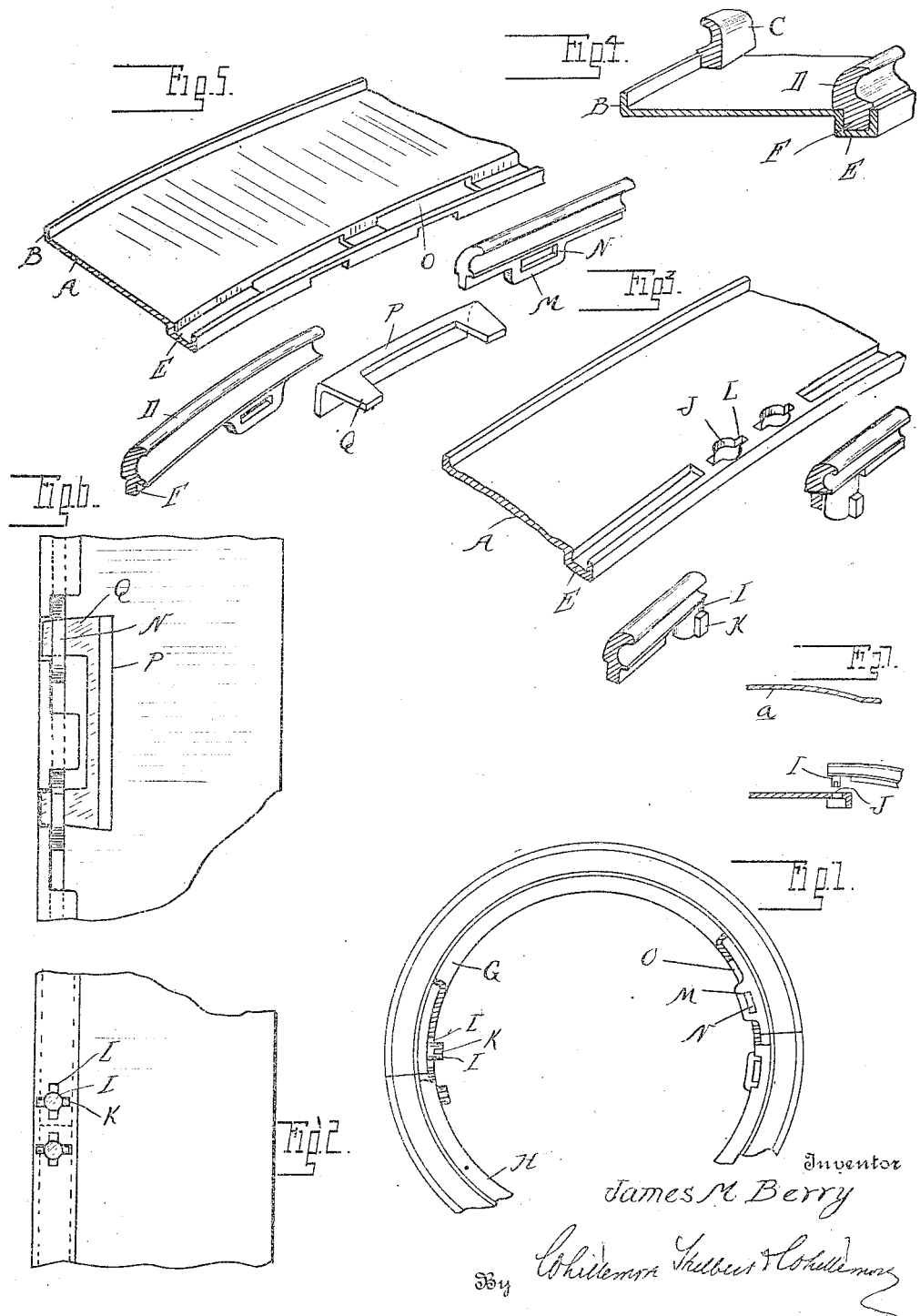

JAMES M. BERRY, OF DETROIT, MICHIGAN.

RIM.

1,211,056.  Specification of Letters Patent.  Patented Jan. 2, 1917.

Application filed October 11, 1915. Serial No. 55,246.

*To all whom it may concern:*

Be it known that I, JAMES M. BERRY, a citizen of the United States of America, residing at Detroit, in the county of Wayne and State of Michigan, have invented certain new and useful Improvements in Rims, of which the following is a specification, reference being had therein to the accompanying drawings.

The invention relates to wheel rims and more particularly to a rim of the type having a detachable side flange.

The invention resides in the novel manner of securing the detachable side flange in place upon the rim proper, and in certain details of construction and arrangements and combinations of parts as will more fully hereinafter appear.

In the drawings, Figure 1 is a side elevation partly in section, of a rim embodying the invention; Fig. 2 is a plan view showing the connection between the rim proper and the ring segments, at one side of the rim; Fig. 3 is a perspective view of the parts shown in Fig. 2, with the ring segments detached; Fig. 4 illustrates a cross-section of the rim; Fig. 5 is a perspective view showing the connections between the opposite ends of the segments and the rim proper, from that shown in Figs. 2 and 3; Fig. 6 is a plan view showing the parts illustrated in Fig. 5 assembled; and Fig. 7 illustrates the manner of engaging one end of the segment with the rim.

One method of securing tires to rims is the provision of a resilient ring engaging a groove in the rim and serving to lock one of the retaining flanges for the tire upon the rim. It is necessary to securely fasten this ring to the rim and yet have the ring such as to be readily engaged with or removed from the rim. With the structure embodying my invention I form the ring in a plurality of segments, preferably two semi-circular segments, and connect the ends of these segments to the rim so that they may be easily and quickly engaged with or detached from the rim.

Referring more particularly to the arrangement of parts shown in the drawings, A designates the rim, which may be either permanently or demountably secured to the wheel felly.

B is an outwardly-extending flange at one side of the rim forming an abutment for an endless ring C, which forms one of the retaining members for the tire.

D is the opposite retaining member for the tire. In the particular structure illustrated the rim is provided with a groove E adjacent one side thereof, and the ring D has a portion F that seats within the groove. The ring D is formed in two semi-circular segments G and H and each end of the segments is engaged with the rim entirely independent of the engagement between the rim and the ends of the other segment. Referring to the segment G, one end is provided with an inwardly-extending lug or key I which is adapted to engage an aperture J in the rim. The lug I is provided with laterally-extending projections K that are adapted when the end of the segment is turned at right angles to the position which it occupies when in place upon the rim, to coöperate with lateral extensions L on the aperture J. The opposite end of the segment G is herein shown as having an inwardly-extending lug M apertured at N. The lug M is adapted to engage a recess O in the rim. It will be noted that the key I can be engaged with the aperture J when the segment G is at right angles to the rim. This is very desirable, since when the rim is on the wheel the end carrying the lug I may be inserted between the fender $a$ and the rim into engagement with the opening J and then the segment turned about the lug I as a pivot and moved into engagement with the groove E. The opposite end of the segment G is then sprung into the groove, which causes the lug M to pass into the opening O. The engagement between the rim and the segment H, with the structure shown in Figs. 1 to 6 inclusive, is the same as that described in connection with the rim G. After the parts are arranged as shown in Fig. 1, a key P may be employed for securing the lugs M within the openings O. As shown this key has laterally-extending wedge-shaped projections Q that fit within the apertures N in the lugs M.

As will be noted, the engagement between each end of each of the segments and the rim is entirely independent of the engagement between the corresponding end of the other segment. Furthermore, the connection between each end of the segments is such as to secure such end against lateral movement in either direction, and also gives radial outward movement. The keys I are so proportioned in relation to the segment and the opening J so arranged that when the key is engaged with the opening, the end of the segment does not pass materially inward beyond the plane of the inner face of the flange or retaining member D when the latter is secured to the rim. Also the engagement between the lugs M and the apertures O is such as to be without such plane. Such an arrangement does not require the heavy bead on the tire to be moved inward during the engagement of the ring segments with the rim, beyond the plane which the bead occupies when the tire is secured in place upon the rim.

What I claim as my invention is:—

1. The combination with a tire rim having a grooved portion at one side thereof, of a detachable ring for engaging said groove formed of complementary segments, seats formed in the rim, a head formed at one end of each of the segments adapted to be engaged with a seat in the rim when the segment is arranged in the plane transverse to the rim and to interlock with said seat when turned into operative relation with the rim, and means for securing the other end of each segment to the rim.

2. The combination with a tire rim, of a detachable ring for engaging the rim adjacent one side thereof, said ring being formed of complementary segments, seats formed in the rim, a head formed on one end of each of the segments and engageable with its respective seat when the segment is in a plane cross-wise of the rim, said head interlocking with the rim when the segment is in operative position upon the rim, and means for securing the other end of each segment to the rim.

In testimony whereof I affix my signature in presence of two witnesses.

JAMES M. BERRY.

Witnesses:
JAMES P. BARRY,
ARTHUR D. PULVER.